United States Patent [19]
Goodwin

[11] 3,772,525
[45] Nov. 13, 1973

[54] ATMOSPHERIC TRANSMISSOMETER

[75] Inventor: Raymond W. Goodwin, Westport, Conn.

[73] Assignee: United Aircraft Corporation, East Hartford, Conn.

[22] Filed: May 1, 1972

[21] Appl. No.: 249,375

[52] U.S. Cl. ................. 250/565, 356/205, 250/575
[51] Int. Cl. ........................................... G01n 21/26
[58] Field of Search ...................... 250/218, 43.5 R, 250/43.5 D; 356/183, 294, 205, 206

[56] References Cited
UNITED STATES PATENTS

| | | | |
|---|---|---|---|
| 3,619,624 | 11/1971 | Sorensen | 250/218 |
| 3,652,850 | 3/1972 | Briggs | 250/218 |
| 3,677,652 | 7/1972 | Little | 250/218 |
| 3,146,293 | 8/1964 | LeSage | 250/218 |
| 3,698,820 | 10/1972 | Hanff | 250/218 |
| 3,700,330 | 10/1972 | Davis | 250/218 |
| 3,519,354 | 7/1970 | Brown | 250/218 |
| 3,518,001 | 6/1970 | Hell | 250/218 |

Primary Examiner—James W. Lawrence
Assistant Examiner—D. C. Nelms
Attorney—Melvin Pearson Williams

[57] ABSTRACT

A pair of corner reflectors have their reflective surfaces disposed to reflect light towards each other. A known percentage of light reflected from one reflector is reflected back towards the other reflector. A transmitter/receiver, disposed adjacent to one of the reflectors, transmits a light pulse towards the other reflector. Portions of two successive light pulses reflected from the other reflector are received by the transmitter/receiver. Apparatus responsive to the strengths of the two received light pulses provides a voltage related to the difference of the logarithms thereof, whereby a voltage is provided which is proportional to the atmospheric transmissibility of the medium between the reflectors.

7 Claims, 2 Drawing Figures

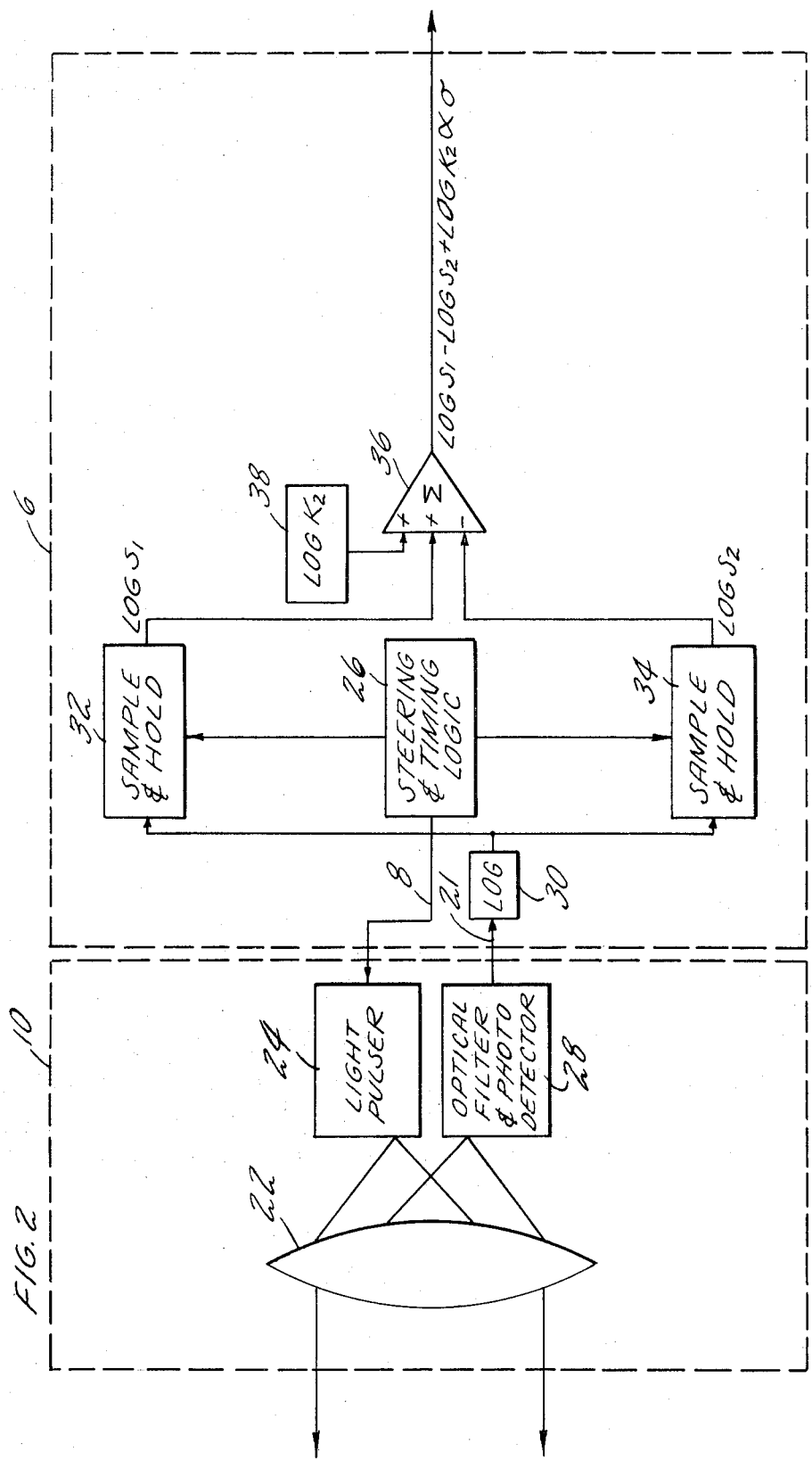

ATMOSPHERIC TRANSMISSOMETER

BACKGROUND OF THE INVENTION

1. Field of the Invention

This invention relates to electro-optical signal processing and more particularly to transmissometers.

2. Description of the Prior Art

The transmissibility coefficient is a quantity that is associated with the absorption and scattering of transmitted light within a medium (such as the atmosphere); the transmissibility coefficient is also associated with "visibility" within the medium. A quantative evaluation of the transmissibility coefficient may be desired when evaluating the particle pollution of the atmosphere, determining the decrease of visibility due to a fog or in other applications.

All transmissometers attempt to provide a transmissibility signal proportional to the transmissibility coefficient. In one transmissometer known in the prior art, a light beam of "known" strength is transmitted over a known atmospheric path length to a receiver comprised of an electro-optic detector. The "known" strength is compared with the strength of the received light beam, the transmissibility signal being provided in response to the result of the comparison. Transmissibility signals provided by transmissometers of this type are influenced by variations in the sensitivity of the receiver and variations in the transmitted beam strength. These transmissometers require frequent calibration and hence are not conveniently used.

Other transmissometers known in the prior art optically sample a portion of each transmitted light pulse from a light pulse transmitter included therein, the sample being used for calibration of the transmitter. These transmissometers are generally complex because the proportion of the sampled portion of the pulse to the transmitted portion must remain constant. Additionally, transmissibility signals provided by these transmissometers are influenced by electrical noise occurring at the instant that the light pulse is transmitted.

Transmissometers known in the prior art are unreliable, complex and require frequent calibration.

SUMMARY OF THE INVENTION

An object of the present invention is to provide atmospheric transmissometers which are insensitive to variations in components thereof and do not require calibration.

According to the present invention, portions of a single pulse of light are transmitted to a receiver along two optical paths of known length within a medium, one path being longer than the other, and a signal proportional to the transmissibility coefficient of the medium is determined from the ratio of the strength of a received light pulse from the shorter path to the strength of a successively received light pulse from the longer path; the ratio is dependent upon known constants and is independent of the strength of the tranmitted pulse.

In further accord with the present invention, a signal linearly related to the difference of the logarithms of the strengths of the two received light pulses is generated, the signal being proportional to the coefficient of transmissibility associated with the medium.

The present invention provides transmissometers insensitive to variations in components thereof and requires no calibration.

Other objects, features and advantages of the present invention will become more apparent in the light of the following detailed description of a preferred embodiment thereof as illustrated in the accompanying drawing.

BRIEF DESCRIPTION OF THE DRAWING

FIG. 2 is a schematic block diagram of a transmitter/receiver and a signal processor for use in the embodiment of FIG. 1.

DESCRIPTION OF THE PREFERRED EMBODIMENT

Figure 1:
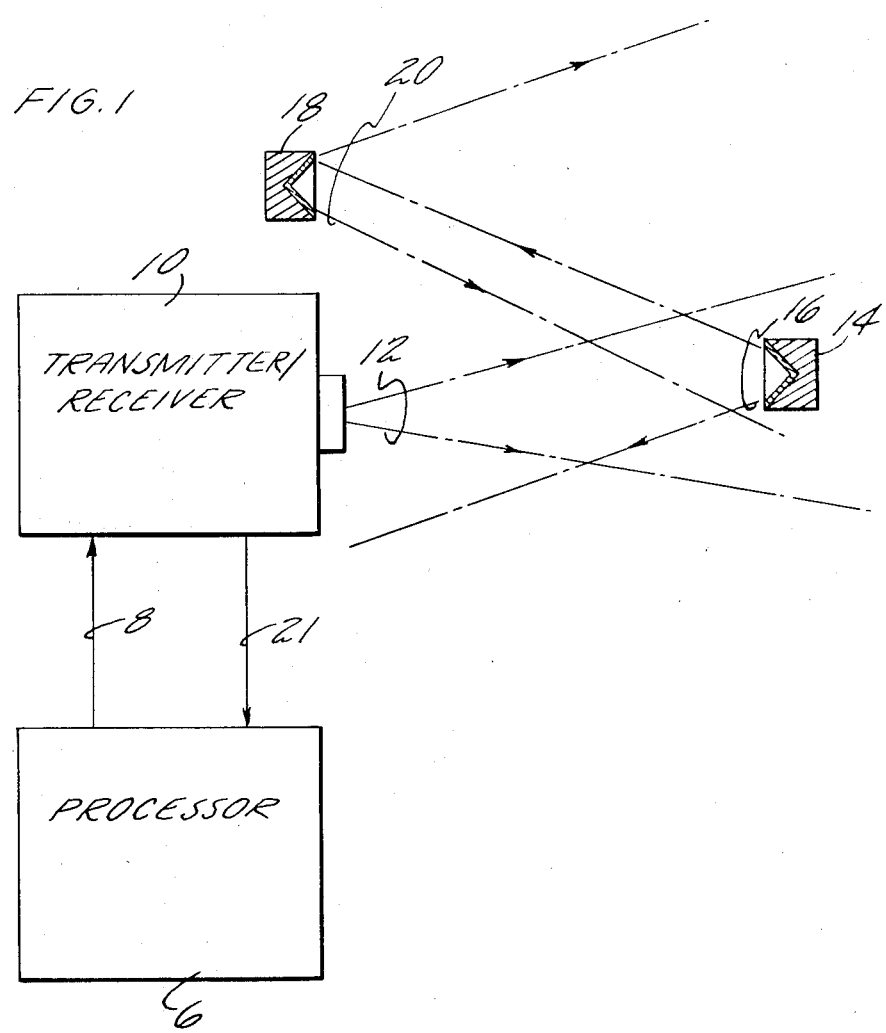
FIG. 1 is a schematic block diagram of the preferred embodiment of the present invention.

Referring now to FIG. 1, in response to a timing signal provided by a processor 6 through a signal line 8 an optical pulse transmitter/receiver 10 transmits a light pulse, typically 50 nanoseconds in duration, along a path segment 12. A first corner reflector 14 first reflects along a path segment 16 a known percentage of the transmitted pulse. A first received pulse, comprised of a portion of the first reflected pulse, is received by the transmitter/receiver 10. The "round trip" path from the transmitter/receiver 10, to the reflector 14 and back to the transmitter/receiver may be thought of as a first optical path.

As is known to those skilled in the art, the intensity of the first received pulse is in accordance with a relationship given as:

$$S_1 = K_1 S_o K_2 e^{-2x\sigma}$$

Where $S_1$ is the intensity of the first received pulse;

$K_1$ is a proportionality constant;

$S_o$ equals the strength of the transmitted pulse;

$K_2$ equals a constant related to the known percentage of the transmitted pulse reflected from the reflector 14;

$\sigma$ is the atmospheric transmissibility coefficient;

$x$ is the distance from the transmitter/receiver 10 to the reflector 14; and 2x is the length of the first optical path.

In order to prevent an overlap at the transmitter/receiver between a transmitted pulse and a first received pulse, the distance, $x$, from the transmitter/receiver 10 to the reflector 14 must be sufficiently large to cause the time for the traverse of the first optical path to be greater than the duration of the transmitted pulse. Since the speed of light is about 1 foot per nanosecond, a distance ($x$) greater than 25 feet is required between the reflector 14 and the transmitter/receiver 10 when the transmitted pulse has a duration of 50 nanoseconds.

A second corner reflector 18, similar to the reflector 14, is disposed adjacent to the transmitter/receiver 10, whereby the distance between the reflectors 14, 18 equals the distance between the reflector 14 and transmitter/receiver 10. The reflector 18 is disposed to cause the reflectors 14, 18 to reflect the known percentage of light from one to the other. The known percentage of the first reflected pulse comprises a second reflected pulse which is reflected from the reflector 18 along the path segment 20 back to the reflector 14. The known percentage of the second reflected pulse comprises a third reflected pulse which is reflected from the reflector 14 along the path segment 16 towards the transmitter/receiver 10 (and the reflector 18). A second received pulse, comprised of a part of the third reflected pulse, is received by the transmitter/receiver 10. The "round trip path" from the transmitter/receiver 10, to the reflector 14, to the reflector 18, to the reflector 14 and back to the transmitter/receiver 10 may be thought of as a second optical path. The strength of the second received pulse is in accordance with a relationship given as:

$$S_2 = K_1 S_o K_2^2 e^{-4x\sigma}$$

where
$S_2$ is the intensity of the second received pulse; and
$4x$ is the length of the second path.

Therefore, a single transmitted light pulse provides two successively received light pulses. It should be understood that the reflectors 14, 18 are so aligned that a light pulse introduced therebetween is reflected between the reflectors 14, 18 many times. Although the preferred embodiment provides a second optical path twice the length of the first optical path (by receiving the light pulses successively reflected by the reflector 14), similar embodiments may have a second optical path longer than the first by any suitable multiple thereof. An explicit relationship of the transmissibility coefficient, $\sigma$, to the strength of the received pulses may now be readily determined by algebraic manipulation. Dividing the equation for the intensity of the first pulse by the equation for the intensity of the second pulse provides:

$$S_1/S_2 = (1/K_2) e^{(4x-2x)\sigma} = (1/K_2) e^{2x\sigma}$$

therefore $$\ln (S_1/S_2) = \ln S_1 - \ln S_2 = \ln (1/K_2) + 2x\sigma$$

solving for $\sigma$ $$\sigma = 1/2x \, (117 S_1 - \ln S_2 - (1/K_2))$$
$$= 1/2x \, (\ln S_1 - \ln S_2 + \ln K_2)$$

It should be noted that in the equations for the ratio, $S_1/S_2$ and the transmissibility coefficient, $\sigma$, the strength of this transmitted pulse, $S_o$, is absent because the equations are independent of $S_o$.

It should be understood that in the equation for the transmissibility coefficient, $\sigma$, a displacement constant, $1/2x$, is the reciprocal of the difference in the lengths of the first and second optical path. In other embodiments of the present invention where other optical paths are utilized, the displacement constant may be different.

In a manner explained more fully hereinafter, the receiver/transmitter 10 provides on a signal line 21 a voltage proportional to the strength of the received light pulses which are processed in operations analogous to the equations which express the transmissibility.

Referring now to FIG. 2, the transmitter/receiver 10 is comprised of a lens 22 through which light pulses are transmitted and received. A light pulser 24 of any suitable type has its input connected to the line 8. A steering and timing logic unit 26 is the processor 6 is comprised of an oscillator and a counter for providing timing and steering pulses in a well known manner. The logic unit 26 applies timing pulses through the line 8 to the pulser 24 which provides in response thereto a transmitted light pulse (which is transmitted through the lens 22). An optical filter and photodetector unit 28, well known in the art, receives the light pulses received by the transmitter/receiver 10 (through the lens 22). A voltage proportional to the strength of a received light pulse is provided by the filter and detector unit 28 through the signal line 21 to the processor 6.

A logarithmic amplifier 30, such as the one disclosed in U.S. Pat. No. 3,252,006 or any other suitable type, has its input connected to the signal line 21. The logarithmic amplifier 30 provides voltages proportional to the logarithm of an applied input whereby voltages are provided proportional to the logarithms of the strength of received light pulses. Sample and hold units 32, 34 have data inputs connected to the output of the logarithmic amplifier 30. Steering inputs of the sample and hold circuits 32, 34 are connected to the logic unit 26 which provides steering pulses. The application of a steering pulse causes the sample and hold circuit to store the voltage applied to its data input and continuously provide it as an output (until there is another steering pulse).

Since the lengths of the optical paths are known, the times that first and second received pulses are received (following a transmitted pulse) is also known (because the velocity of light is substantially constant). During a time that the first received pulse is received by the filter and detector 28, the logic unit 26 provides a steering pulse to the sample and hold circuit 32, thereby causing a voltage at the output thereof proportional to the logarithm of the first received pulse.

During the time that the second received pulse is received by the filter and detector 28, the logic unit 26 provides a steering pulse to the sample and hold circuit 34, thereby causing a voltage at the output thereof proportional to the logarithm of the second received pulse.

A summing amplifier 36 has an input connected to a voltage source 38 which provides a voltage proportional to the logarithm of the constant, $K_2$. Other inputs of the amplifier 36 are connected to the respective outputs of the sample and hold circuits 32, 34. The summing amplifier provides a transmissibility signal voltage proportional to the difference of the logarithms of the intensities of the first and second received pulses added to the logarithm of the constant $K_2$. The transmissibility signal voltage is proportional to the transmissibility coefficient, $\sigma$.

It should be understood that the transmitter/receiver 10 may include other means, such as a suitable A/D converter, for processing the received signals and providing signals for a visual display of digits that indicate transmissibility.

It should be understood that in other embodiments a transmitter and a receiver may be included as disjunctive units with the optical paths therebetween. Optical means, such as beam splitters and reflectors may be used to provide two optical paths of suitably different lengths whereby two received pulses without an overlap may be received by the receiver. In the other embodiments the two received pulses travel over optical paths having different spatial locations. In the preferred embodiments, the second optical path is substantially "folded" within the first optical path, thereby providing two optical paths having substantially the same spatial location. Providing substantially the same spatial location of the optical paths causes the medium for each to be substantially identical.

Although the invention has been shown and described with respect to a preferred embodiment thereof, it should be understood by those skilled in the art that various changes and omissions in the form and detail thereof may be made therein without departing from the spirit and the scope of the invention.

Having thus described a typical embodiment of my invention, that which I claim as new and desire to secure by Letters Patent of the United States is:

1. In the method of providing a signal proportional the transmissibility coefficient of light in a medium where pulses of light are transmitted between a single optical transmitter and a single optical receiver, the steps of:

transmitting from said transmitter a transmitted light pulse over first and second paths within said medium, said first path being shorter than said second path;

receiving at said single optical receiver, at a time commensurate with the time required for said light pulse to traverse said first path, a first received light pulse, which is part of said transmitted pulse, to establish a first light intensity related to the absorption and scattering of the transmitted light pulse in said medium between the times of transmitting said transmitted light pulse and receiving said first received pulse;

subsequent to receiving said first received light pulse, receiving at said single optical receiver, at a time commensurate with the time required for said light pulse to traverse said second path, a second received pulse to establish a second light intensity related to the absorption and scattering of the transmitted light pulse in said medium between the times of transmitting said transmitted light pulse and receiving said second received light pulse;

providing a transmissibility signal related to the ratio of said light intensities, said transmissibility signal being proportional to the transmissibility coefficient of light in said medium.

2. An atmospheric transmissometer for providing a transmissibility signal proportional to the optical transmissibility coefficient along first and second optical paths within a medium, said second path being longer than said first path, comprising:

a single optical transmitting means for transmitting a single light pulse along both of said optical paths;

a single optical receiving means for successively receiving through a single optical element light pulses transmitted by said transmitting means along both of said optical paths;

processing means responsive to said single optical receiving means for providing a transmissibility signal related to the ratio of the respective intensities of light pulses successively received by said receiving means from respective ones of said optical paths, said transmissibility signal being proportional to said transmissibility coefficient within said medium.

3. Apparatus according to claim 2 wherein said receiving means and said transmitting means comprise a single optical transmitter/receiver which both transmits and receives light pulses through a common optical element, and optical reflection means defining said first and second optical paths.

4. Apparatus according to claim 3 wherein said optical reflection means comprises first and second reflectors being disposed to reflect light from each to the other, said optical transmitter/receiver being disposed for transmitting light toward and receiving light from said first reflector, whereby said second optical path includes said first optical path.

5. Apparatus according to claim 4 wherein said second reflector is disposed adjacent to said transmitter/receiver, whereby said first optical path is one-half the length of said second optical path and said paths have substantially the same spacial location.

6. Apparatus according to claim 2 wherein said processing means comprises:

logarithmic amplifier means responsive to said single optical receiving means for providing logarithm signals respectively proportional to the logarithms of the intensities of the received light pulses;

storage means responsive to said logarithmic amplifier means for storing said logarithm signals; and means responsive to said storage means for providing said transmissibility signal as the difference of said stored logarithm signals plus a constant.

7. Apparatus according to claim 6 wherein said processing means additionally comprises timing means connected to said transmitting means and to said storage means for providing timing pulses and steering pulses respectively thereto, said transmitting means providing light pulses in response to said timing pulses, said storage means selectively storing successive ones of said logarithm signals in response to said steering pulses.

* * * * *